United States Patent Office 3,167,578
Patented Jan. 26, 1965

3,167,578
PROCESS FOR THE MANUFACTURE OF CARBOXYLIC ACID-TERTIARY ALKYL ESTERS
Hans Fernholz, Bad Soden, Taunus, and Eberhard Mundlos, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 29, 1960, Ser. No. 46,036
Claims priority, application Germany, Aug. 8, 1959, F 29,133
9 Claims. (Cl. 260—465.4)

The present invention relates to a process for the manufacture of carboxylic acid-tertiary alkyl esters.

It is known that carboxylic acid esters of tertiary aliphatic alcohols cannot be prepared by one of the usual esterification methods with the use of an acid as the catalyst in view of the fact that tertiary alcohols are dehydrated in an acid medium and thus converted into corresponding olefins. In preparing such esters from tertiary alcohols, care must therefore be taken to avoid acid reaction during esterification. This can be achieved by reacting carboxylic acid chlorides or anhydrides with either an alkali metal, alkaline earth metal or aluminum compound of a tertiary alcohol or directly with a tertiary alcohol in the presence of a tertiary base, such as pyridine or dimethylaniline. It is also known that tertiary alkyl esters can be prepared by reacting a formate of a tertiary alcohol using an alkali as the catalyst. This process is very complicated and expensive since formic acid-tertiary alkyl esters are difficult to prepare by one of the methods usually used. Moreover, the mixed formic acid-acetic acid anhydride must be prepared in a very complicated process. The difficulties are similar in the other processes mentioned above so that they cannot be used on an industrial scale.

In a further known process for making carboxylic acid-tertiary alkyl esters, carboxylic acids are added to tertiary olefins. In this addition reaction, an equilibrium is obtained in which the formation of ester is the greater the stronger the carboxylic acid used. Thus, for example, it is known that the relatively strong fluorinated acetic acids, such as trifluoroacetic acid, react very smoothly with tertiary olefins, such as isobutene, no catalyst being necessary in this specific reaction. Quite generally, it is, however, necessary to use a catalyst in order to add carboxylic acid to a tertiary olefin. The catalysts previously used in those processes were zinc chloride, boron trifluoride, concentrated sulfuric acid or even aryl sulfonic acids. The yields of tertiary alkyl esters obtained with the aid of those catalysts are generally unsatisfactory. The catalysts undergo reaction with the especially reactive tertiary olefins and involve the formation of undesired by-products, for example polymeric substances. In addition thereto, sulfuric acid, which is usually used, possesses the disadvantageous property of involving oxidation and sulfonation, whereby sulfur dioxide, emulsions and tarry products are formed, while some carboxylic acids, for example formic acid, are at least partially decomposed. It follows from the above statements that all processes known for making carboxylic acid-tertiary alkyl esters cannot be used on an industrial scale or can be used to a limited extent only.

The present invention relates to a process for making tertiary alkyl esters from carboxylic acid and tertiary olefins, wherein a carboxylic acid is reacted with a tertiary olefin in the presence of polyphosphoric acid at a temperature of between −20° C. and +15° C., advantageously between +10° C. and −10° C., the alkyl esters being obtained in very good yields. This is an unexpected result in view of the fact that reacting polyphosphoric acid with tertiary olefins, such as isobutylene, at temperatures above 15° C. in the presence of a carboxylic acid, for example acetic acid, involves quantitative formation of polymerization products of the olefin, such as diisobutylene and triisobutylene, while carrying out the reaction at a temperature below 10° C. leads exclusively to tertiary alkyl esters, such as acetic acid-tertiary butyl esters.

The term polyphosphoric acid is used to define a solution of diphosphorus pentoxide in commercial concentrated phosphoric acid (ortho-phosphoric acid). For carrying out the process of this invention, there may be used phosphoric acid solutions containing 20–90%, advantageously 50–85% diphosphorus pentoxide. As carboxylic acids there may generally be used those compounds which contain one or more carboxylic groups, or more especially aliphatic, alicyclic, aromatic, or heterocyclic carboxylic acids, such as formic acid, acetic acid, propionic acid, butyric acid, isobutyric acid, α-methylbutyric acid, diethyl-acetic acid, trimethyl-acetic acid, acrylic acid, methacrylic acid, crotonic acid, sorbic acid, malonic acid, malonic acid monoethyl ester, succinic acid, maleic acid, fumaric acid, adipic acid, sebacic acid, monochloro-acetic acid, alanine, lacetic acid, levulinic acid, cyano-acetic acid, hexahydrobenzoic acid, benzoic acid, o-toluylic acid, m-toluylic acid, p-toluylic acid, phthalic acid, cinnamic acid, p-hydroxybenzoic acid, p-nitrobenzoic acid, o-chlorobenzoic acid, m-chlorobenzoic acid, p-chlorobenzoic acid, p-aminobenzoic acid, nicotinic acid, isonicotinic acid, etc.

Ethylene derivatives containing a tertiary carbon atom at the double bond are termed tertiary olefins. The most important representatives of those tertiary olefins which may be used in the process of this invention are, for example, isobutylene, 2-methyl-butene-1, 2-methyl-butene-2, 2,3-dimethylbutene-1, 2-methylpentene-1, 2-methylhexene-1. Mixtures of those olefins may also be used, especially in that case when the same ester is obtained from such mixture.

In carrying out the process of this invention, it is advantageous to first introduce polyphosphoric acid into the reaction vessel and then to add carboxylic acid. These two components should be introduced in a manner such that they are always mixed in the weight ratio of 10:1 to 1:10, preferably 6:1 to 1:6. The olefin is then added to such mixture while cooling and advantageously while stirring, the temperature being not allowed to exceed +10° C., regardless of whether the process is carried out in continuous or discontinuous manner. In carrying out the process of this invention discontinuously it is advantageous to use a slight superatmospheric pressure of up to 5, preferably 3 atmospheres. Quite generally, it is not necessary to work under superatmospheric pressure so that continuous operation is easy to carry out, for example, with the aid of a column. The column is advantageously provided in its lower part, which is charged with a carboxylic acid polyphosphoric acid mixture, with a stirring means ("oscillating column") while its upper part serves as a calming zone. Olefin and carboxylic acid are introduced into the mixture at the bottom of the column, the ester forming being separated in the upper part of the column, where it can readily be drawn off. It is washed with water, dried, for example with sodium sulfate or magnesium sulfate, and then distilled, advantageously in the presence of a small amount of sodium hydrogen carbonate, and then obtained in purified form.

When a carboxylic acid which is scarcely soluble in polyphosphoric acid is used, it is advantageous to use its solutions in those solvents that are inert towards polyphosphoric acid. As inert solvents there may be used more especially: ethers, such as diethyl ether, diisopropyl ether, dihexyl ether, advantageously cyclic ethers, such as dioxan or tetrahydrofurane. It is convenient to use fairly concentrated, but at least 10% carboxylic acid solutions.

The process of this invention offers the special advantage that carboxylic acids such as tertiary carboxylic acids, for example trimethyl acetic acid, which are otherwise difficult to esterify, can be converted into tertiary alkyl esters. Under the conditions used, polyphosphoric acid does not attack even readily decomposable carboxylic acids so that the process described in this application can be generally used. It may be used, for example, for obtaining in simple manner and with a practically quantitative yield the formic acid-tertiary alkyl esters which were hitherto so difficult to prepare. A still further advantage resides in the fact that, under the conditions used in the instant process, polyphosphoric acid selectively catalyzes the addition of carboxylic acids to tertiary olefins, whereas other olefins, such as primary or secondary ethylene derivatives, are not reacted under the conditions here used.

The process of this invention can therefore be used with advantage for separating tertiary olefins from mixtures with primary and secondary olefins and other hydrocarbons. Thus, for example, isobutylene is quantitatively separated from $C_4$-fractions which are obtained in cracking operations and contain butane, butene-1- and butadiene in addition to isobutylene using a carboxylic acid, such as formic acid, acetic acid or propionic acid, which is readily soluble in polyphosphoric acid. The tertiary alkyl esters obtained are separated from unreacted material and may then be used as such, for example, as solvents; or the acetic acid-tertiary butyl ester may be used as fuel additive to increase its octane number; or they may be saponified to obtain corresponding tertiary alcohols. The process of this invention may also be used for recovering and purifying tertiary olefins in view of the fact that carboxylic acid-tertiary alkyl esters decompose at a raised temperature in the presence of a catalytic amount of a strong acid into their components.

The following examples serve to illustrate the invention but they are not intended to limit it thereto. The parts are by weight unless otherwise stated.

*Example 1*

310 liters 79% isobutylene were introduced within 3 hours at 0° C. while stirring into a mixture of 500 grams formic acid and 100 grams polyphosphoric acid prepared from 100 parts 85% phosphoric acid and 117 parts diphosphorus pentoxide. Stirring was continued for a further 30 minutes and 1500 cc. ice water were added. The upper layer which contained the ester was separated, dried over sodium sulfate and distilled over 10 grams sodium hydrogen carbonate.

Yield: 1060 grams formic acid-tertiary butyl ester; boiling point: 81.5–83° C. under a pressure of 760 mm. of mercury.

*Example 2*

152 grams 2-methyl-butene-2 were added while stirring and cooling to —5 to 0° C. to a mixture of 100 grams of the polyphosphoric acid used in Example 1 and 100 grams formic acid. When the exothermal reaction was complete, 500 cc. ice water were added. The upper layer was separated, dried over sodium sulfate, and distilled over 2 grams sodium hydrogen carbonate.

Yield: 186 grams formic acid-tertiary amyl ester; boiling point 112–113° C. under a pressure of 760 mm. of mercury.

*Example 3*

170 grams 3-methyl-pentene-2 were added at about 0° C., while stirring, to a mixture of 150 grams of the polyphosphoric acid used in Example 1 and 100 grams formic acid. After the reaction was complete, 800 cc. of ice water were added. The upper layer was separated, washed with a dilute solution of sodium hydrogen carbonate and distilled.

Yield: 162 grams formic acid ester of 3-methyl-pentanol-3; boiling point: 139–141° C. under a pressure of 760 mm. of mercury.

*Example 4*

A column ("oscillating column") provided in its lower part with a stirring means was charged to about one third its volume with a mixture of 200 grams formic acid and 1000 grams polyphosphoric acid prepared from 160 parts 85% phosphoric acid and 100 parts diphosphorus pentoxide, and the formic acid-tertiary butyl ester was prepared in continuous manner. 100 liters isobutylene and 206 grams formic acid were introduced per hour at —10 to —5° C., while stirring, into the mixture so obtained. The resulting ester separated in the upped part of the column. To accelerate separation, a mixture of paraffinic hydrocarbons boiling at 200–220° C. can be used. 430 grams/hour formic acid-butyl ester which was purified by distillation were obtained.

*Example 5*

In the manner described in Example 4, 153 liters of a mixture containing butane, butadiene and 33% isobutylene were introduced per hour at —5° to +5° C. into a solution of 400 grams acetic acid and 800 grams of the polyphosphoric acid used in Example 1. About 250 g./hour acetic acid-tertiary butyl ester which was purified by distillation were obtained. The ester boiled at 96–98° C. under a pressure of 750 mm. of mercury.

*Example 6*

230 grams liquid 75% isobutylene were added to 500 grams of the polyphosphoric acid used in Example 1 and 250 grams butyric acid in a 3 liter autoclave provided with a stirrer. The autoclave was closed, the mixture was well cooled and stirred. The temperature rose temporarily to +10° C. and the pressure to 3 atmospheres. The reaction was complete after 30 minutes. After the addition of 1½ times the amount by volume of water, the upper layer was separated, washed with sodium hydrogen carbonate solution, and distilled. 190 grams butyric acid-tertiary butyl ester (boiling point: 40–41° C. under a pressure of 12 mm. of mercury) were obtained in addition to 119 grams unreacted butyric acid.

*Example 7*

220 grams liquid 75% isobutylene were reacted in the manner described in Example 6 with 220 grams propionic acid in 500 grams polyphosphoric acid and worked up. 250 grams propionic acid-tertiary butyl ester were obtained in addition to 62 grams unreacted propionic acid.

*Example 8*

150 grams liquid 75% isobutylene were reacted in the manner described in Example 6 with 300 grams α-methylbutyric acid in 600 grams polyphosphoric acid and worked up. 280 grams tertiary butyl ester (boiling point: 28–30° C. under a pressure of 6 mm. of mercury) were obtained in addition to 170 grams unreacted α-methylbutyric acid.

*Example 9*

230 grams liquid isobutylene were reacted in the manner described in Example 6 with 250 grams trimethyl acetic acid in 500 grams polyphosphoric acid and worked up. 140 grams ester (boiling point: 40–42° C. under a pressure of 23 mm. of mercury) were obtained in addition to 160 grams unreacted trimethyl-actic acid.

*Example 10*

150 grams liquid 75% isobutylene were added in the manner described in Example 6 to a mixture of 240 grams benzoic acid, 300 grams dioxan, and 700 grams polyphosphoric acid. The whole was stirred for 8 hours and then mixed with 1200 grams water. The upper layer was washed with an aqueous sodium hydrogen carbonate solution, dried over sodium sulfate, and distilled.

Yield: 180 grams benzoic acid-tertiary butyl ester (boiling point: 96–98° C. under a pressure of 12 mm. of mercury).

Unreacted benzoic acid was not isolated.

We claim:

1. A process for the preparation of a tertiary alkyl ester of a carboxylic acid which comprises reacting a carboxylic acid with an olefinic hydrocarbon having a tertiary carbon atom at the double bond substituted by two saturated alkyl groups in the presence of a solution of diphosphorus pentoxide in orthophosphoric acid containing 20 to 90% diphosphorus pentoxide at a temperature within the range of between −20° C. and +15° C.

2. A process for the preparation of a tertiary alkyl ester of a carboxylic acid which comprises reacting an aliphatic carboxylic acid of 1 to 5 carbon atoms with an olefinic hydrocarbon having a tertiary carbon atom at the double bond substituted by two saturated alkyl groups in the presence of a solution of diphosphorus pentoxide in orthophosphoric acid containing 20 to 90% diphosphorus pentoxide at a temperature within the range of between −20° C. and +15° C., the ratio by weight of carboxylic acid to said solution being between about 10:1 and 1:10.

3. A process for the preparation of a tertiary alkyl ester of a carboxylic acid which comprises reacting a carboxylic acid with an olefinic hydrocarbon of 4 to 7 carbon atoms and having a tertiary carbon atom at the double bond substituted by two saturated alkyl groups in the presence of a solution of diphosphorus pentoxide in ortho phosphoric acid containing 20 to 90% diphosphorus pentoxide at a temperature within the range of between −20° C. and +15° C., the ratio by weight of carboxylic acid to said solution being between about 10:1 and 1:10.

4. The process of claim 1, wherein the reaction is carried out at a temperature within the range of between −10° C. and +10° C.

5. The process of claim 1, wherein a 50–85% solution of diphosphorus pentoxide in phosphoric acid is used.

6. The process of claim 1, wherein 10 to 0.1 parts by weight of a solution of diphosphorus pentoxide in orthophosphoric acid containing 20 to 90% diphosphorus pentoxide is used per part by weight carboxylic acid.

7. The process of claim 6, wherein 6 to 0.16 parts by weight of a solution of diphosphorus pentoxide in orthophosphoric acid containing 20 to 90% diphosphorus pentoxide is used per part by weight carboxylic acid.

8. The process of claim 1, wherein the carboxylic acid is dissolved in an organic medium inert towards the reaction and added in the form of such solution.

9. The process of claim 1, wherein the olefin is isobutylene.

References Cited in the file of this patent

UNITED STATES PATENTS

| | | |
|---|---|---|
| 2,014,850 | Kane | Sept. 17, 1935 |
| 2,020,673 | Dreyfus | Nov. 12, 1935 |
| 2,093,695 | Larson | Sept. 21, 1937 |
| 2,217,735 | Dreyfus | Oct. 15, 1940 |
| 2,485,125 | Wilkinson | Oct. 18, 1949 |
| 2,525,145 | Mavity | Oct. 10, 1950 |
| 2,575,457 | Mavity | Nov. 20, 1951 |
| 2,584,102 | Mavity | Feb. 5, 1952 |
| 2,613,187 | Mavity | Oct. 7, 1952 |
| 2,822,378 | Bader | Feb. 4, 1958 |
| 3,055,934 | Heisler et al. | Sept. 25, 1962 |

OTHER REFERENCES

Moeller: "Inorganic Chemistry," pages 639–48 (Wiley) (1952).

Royals: Advanced Organic Chemistry, pp. 379–380, 607–8, Prentice-Hall (1954), and 30 JPOS 80, Case No. 228 respectively.

Huhti et al.: "Canadian J. of Chem." 34, pp. 785–94 (1956).

Cram and Hammond: "Organic Chemistry," (McGraw-Hill) (1959), pp. 339–40.